United States Patent
Sato et al.

(10) Patent No.: US 8,080,173 B2
(45) Date of Patent: Dec. 20, 2011

(54) FLUORESCENT SUBSTANCE CONTAINING RARE EARTH METAL, LUMINOUS COMPOSITION COMPRISING THE SAME, PROCESS FOR MANUFACTURING THEREOF, AND LIGHT-EMITTING ELEMENT COMPRISING THE FLUORESCENT SUBSTANCE

(75) Inventors: Takahiro Sato, Kawasaki (JP); Hiroki Iwanaga, Yokohama (JP); Akio Amano, Kawasaki (JP); Shinji Murai, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 719 days.

(21) Appl. No.: 12/178,199

(22) Filed: Jul. 23, 2008

(65) Prior Publication Data

US 2009/0050851 A1    Feb. 26, 2009

(30) Foreign Application Priority Data

Aug. 20, 2007   (JP) ................. 2007-213638

(51) Int. Cl.
*C09K 11/06*   (2006.01)
(52) U.S. Cl. .............. 252/301.16; 313/503; 313/486; 534/15
(58) Field of Classification Search .......... 252/301.16; 313/503, 486; 534/15
See application file for complete search history.

(56) References Cited

U.S. PATENT DOCUMENTS 7,250,117 B2    7/2007  Iwanaga et al.

FOREIGN PATENT DOCUMENTS

| JP | 11-323324 | 11/1999 |
|---|---|---|
| JP | 2005-252250 | 9/2005 |
| JP | 3811142 | 6/2006 |
| JP | 2007-46021 | 2/2007 |

OTHER PUBLICATIONS

U.S. Appl. No. 12/716,728, filed Mar. 3, 2010, Iwanaga, et al.
U.S. Appl. No. 11/958,111, filed Dec. 17, 2007, Shinji Murai.
Philip Lenaerts, et al. "Luminescent europium (III) and terbium (III) nicotinate complexes covalently linked to a 1,10-phenanthroline functionalised sol-gel glass", Journal of Luminescence, 2006, vol. 117, pp. 163-169.
N. Filipescu et al.-"Substituent Effects on Intramolecular Energy Transfer. II. Fluorescence Spectra of Europium and Terbium β-Diketone Chelates", The Journal of Physical Chemistry vol. 68, No. 11, Nov. 1964, pp. 3324-3346.
H. Iwanaga et al.-"Development of ultraviolet LED devices containing europium (III) complexes in fluorescence layer", Journal of Alloys and Compounds, 408-412, (2006), pp. 921-925.

*Primary Examiner* — Carol M Koslow
(74) *Attorney, Agent, or Firm* — Oblon, Spivak, McClelland, Maier & Neustadt, L.L.P.

(57) ABSTRACT

The present invention provides a fluorescent substance excellent in emission intensity and in emission efficiency. The substance can be excited by light at a longer wavelength than ever. The present invention also provides a luminous composition comprising the fluorescent substance and a light-emitting element using the substance. The fluorescent substance comprises a rare earth metal and a phosphine oxide ligand which coordinates to said rare earth metal and said ligand containing at least one siloxane bond in its structure. The fluorescent substance can be produced from a reaction between a compound having a siloxane bond and a rare earth complex coordinated by a phosphine oxide ligand. The luminous composition comprises the fluorescent substance.

10 Claims, 3 Drawing Sheets

FLUORESCENT SUBSTANCE CONTAINING RARE EARTH METAL, LUMINOUS COMPOSITION COMPRISING THE SAME, PROCESS FOR MANUFACTURING THEREOF, AND LIGHT-EMITTING ELEMENT COMPRISING THE FLUORESCENT SUBSTANCE

CROSS-REFERENCE TO RELATED APPLICATIONS

This application is based upon and claims the benefit of priority from the prior Japanese Patent Applications No. 213638/2007, filed on Aug. 20, 2007; the entire contents of which are incorporated herein by reference.

BACKGROUND OF THE INVENTION

1. Field of the Invention

The present invention relates to a light-emitting element excellent in emission intensity. In particular, the present invention relates to an LED element using an excitation source of light in the near UV to blue region, and it also relates to a fluorescent substance used therein.

2. Background Art

As for fluorescent substances of rare earth metals coordinated by organic ligands such as phosphine oxide and β-diketonato ligands and for LED elements employing them, concepts and examples thereof are described in, for example, Japanese Patent No. 3811142. Organic fluorescent substances like them are superior to inorganic ones in solubility and resin-dispersability in solvents, and hence by utilizing this character the light-extraction efficiency is increased to obtain strong emission intensity in the above examples. In the case where an LED or LD is adopted as an energy source of luminescence, light in a particular wavelength range is used. In many conventional cases, the maximum excitation wavelength, which gives the strongest emission intensity, is often positioned in the wavelength range of 300 nm to 350 nm. Actually, however, since there is a fear that light in the above wavelength range gives harmful effects to the human body, light at a longer wavelength is generally used in practice as the excitation light. It is, therefore, difficult to use light at the most effective wavelength and accordingly it is inevitable to use fluorescent substances of low emission intensity. On the other hand, if the skeletons of ligands are changed so that the fluorescent substances can absorb light at a longer wavelength, the efficiency of energy transfer between the metal and the ligands is so lowered that practically satisfying emission intensity cannot be obtained. Thus, this is a dilemma.

Rare earth metals have specific energy levels of f-electrons, and the electrons of rare earth metal can be excited by irradiation of light having an energy corresponding to the energy level gap between the vacant orbital and the occupied orbital. The luminescence induced by this excitation is not accompanied by the energy transfer from the ligands, and hence does not suffer loss of the energy transfer efficiency. Accordingly, the luminescence generally results from the internal energy conversion with high efficiency. This means that the emission from the excited state occurs with high efficiency. The wavelength corresponding to the energy level gap of f-f transition is often much longer than 400 nm. For example, the transition of $^5D_0 \rightarrow ^7D_2$ in Eu corresponds to 465 nm. The f-f transition of rare earth metal can be, therefore, excited by light at a long wavelength. This means that near ultraviolet LEDs, which emit light around 400 nm, and blue LEDs, which emit light around 460 nm, can be used as an excitation source.

From the viewpoint of quantum chemistry and group theory, the f-f transition of rare earth is forbidden. The forbidden transition is generally activated when the symmetry of orbital is broken in the metal atom. However, the orbital in broken symmetry deviates from the most stable state, and hence is too unstable in energy to break the symmetry drastically and to keep the broken symmetry. In some normally present compounds, the f-f transition is sometimes slightly allowed because of distortion induced by asymmetry of coordination environment around the metal atom. The f-f transition thus has activity, but the activity is nevertheless generally not so large that the excitation occurs with high possibility. Accordingly, even if the emission from the excited state proceeds with high efficiency, the total emission efficiency based on the applied light is often smaller than that of the luminescence by way of the energy transfer from the β-diketonato ligand. For this reason, the luminescence excited by f-f transition has not been satisfying enough to use in LEDs.

Journal of Alloys and Compounds 408-412, pp 921-925 (2006) describes that a rare earth fluorescent substance containing a β-diketonato ligand emits stronger luminescence when also coordinated by a phosphine oxide ligand than when not coordinated by the phosphine oxide ligand. Further, JP-A-2005-252250 (KOKAI) discloses that a fluorescent substance comprising both β-diketonato and phosphine oxide ligands emits strong luminescence when excited at a wavelength in 380 nm to 410 nm. However, even the fluorescent substances described in the above publications exhibit weak emission when excited at a wavelength around 465 nm, where the excitation band of f-f transition in $Eu^{3+}$ is positioned, and hence the f-f transition is not fully activated.

JP-A-2007-46021 (KOKAI) discloses a compound of a rare earth metal coordinated by a ligand of phosphate triester, and it also discloses a luminous composition comprising a resin such as silicone resin and the rare earth complex compound dispersed therein. The disclosed substances emit strong luminescence assigned to an f-f transition observed in the excitation spectrum. However, there is a problem that phosphate triesters are liable to react with fluorine compounds to form fluorophosphate compounds, which are generally fatally poisonous. In addition, the rare earth complex emitting strong luminescence contains a β-diketonato ligand having a fluoroalkyl group such as $CF_3$, and factories treating silicon compounds such as silicone resin also often treat fluorine compounds such as hydrofluoric acid. Accordingly, the disclosed composition is far from practical in view of safety.

Journal of Luminescence 117, pp 163-169 (2006) describes a composition in which a rare earth metal complex is combined with the skeleton of Si—O—Si bonds by the sol-gel method. However, it is also reported that the f-f transition was not observed in the excitation spectrum monitored at 612.5 nm. Accordingly, it has not been known that the f-f transition is activated when the fluorescent substance is combined with the skeleton of Si—O—Si bonds.

SUMMARY OF THE INVENTION

According to the present invention, there is provided that a fluorescent substance comprising a rare earth metal and a phosphine oxide ligand which coordinates to said rare earth metal and said ligand contains at least one siloxane bond in its structure.

According to the present invention, there is also provided that a luminous composition comprising a fluorescent substance comprising a rare earth metal and a phosphine oxide ligand which coordinates to said rare earth metal and said ligand contains at least one siloxane bond in its structure.

According to the present invention, there is also provided that a process for manufacturing of a fluorescent substance, comprising the step in which a rare earth complex comprising a rare earth metal and a phosphine oxide ligand which coordinates to said rare earth metal and said ligand contains at least one bond selected from the group consisting of unsaturated bonds, hydroxyl, and substituted and non-substituted amino groups is made to react with a compound containing at least one siloxane bond.

Furthermore, according to the present invention, there is provided that a light-emitting element comprising a luminous composition comprising said fluorescent substance.

The luminous composition according to the present invention makes it possible to realize a light-emitting element using an excitation source of light in the near UV to blue region to exhibit luminescence excellent in emission intensity.

DETAILED DESCRIPTION OF THE INVENTION

The fluorescent substance according to the present invention is a rare earth metal coordinated by at least one phosphine oxide ligand.

Rare earth metals individually have specific energy levels, and hence the rare earth metal used in the present invention can be optionally selected according to the required emission wavelength and excitation wavelength of f-f transition. For example, $Sm^{3+}$, $Eu^{3+}$ and $Tm^{3+}$ can be used for red light-emitting elements while $Pr^{3+}$, $Tb^{3+}$, $Dy^{3+}$, $Ho^{3+}$ and $Er^{3+}$ can be used for green light-emitting elements. These rare earth metals have some excited f-f transition levels corresponding to light in the near UV to blue region, but in order to obtain a white LED of high intensity the f-f transitions assigned to $^7F_0 \rightarrow {}^5D_2$ of $Eu^{3+}$ at approx. 465 nm and $^7F_6 \rightarrow {}^5D_4$ of $Tb^{3+}$ at approx. 480 nm are important particularly for excitation in the blue region. On the other hand, particularly for excitation in the near UV region, the f-f transitions assigned to $^7F_0 \rightarrow {}^5D_3$ of $Eu^{3+}$ at approx. 390 nm and $^7F_6 \rightarrow {}^5D_3$ of $Tb^{3+}$ at approx. 380 nm are important. Accordingly, among the rare earth metals, $Eu^{3+}$ and $Tb^{3+}$ are particularly preferred.

As a ligand coordinating to the trivalent rare earth metal, a β-diketonato ligand is often used. The fluorescent substance according to the present invention can also comprise a β-diketonato ligand as well as the phosphine oxide ligand. The β-diketonato ligand coordinates as a monovalent anion to the metal atom, and hence the metal atom coordinated by three β-diketonato ligands is a neutral molecule. The metal complex coordinated by the β-diketonato ligands efficiently absorbs light in the wavelength range of 300 nm to 350 nm, and then the energy transfer occurs from the ligands to the center metal ion, and finally luminescence associated with energy relaxation of the metal ion is observed. A rare earth metal complex not comprising the β-diketonato ligand absorbs light in a less amount, and further if it is electrically charged as a whole, the molecule generally has low solubility in an organic compound and hence is often unsuitable for dissolving in the organic compound thickly enough to obtain luminescence of high intensity.

Compounds of trivalent rare earth metals coordinated by β-diketonato ligands can be synthesized, for example, according to Journal of Physical Chemistry, 68, pp 3324-3346 (1964), and are easily obtained by reacting compounds of rare earth metals with β-diketones in the presence of bases.

The compounds of rare earth metals are not particular restricted as long as they are commonly available. Examples of them include inorganic compounds such as oxides, hydroxides, sulfides, fluorides, chlorides, bromides, iodides, sulfates, sulfites, disulfates, hydrogensulfates, thiosulfates, nitrates, nitrites, phosphates, phosphites, hydrogenphospates, dihydrogenphospates, diphosphates, polyphosphates, (hexa)fluorophosphates, carbonates, hydrogencarbonates, thiocarbonates, cyanides, thiocyanides, borates, (tetra)fluoroborates, cyanates, thiocyanates, isocyanates, azides, nitrides, borides, silicates, (hexa)fluorosilicates, and salts of condensed polyacids (e.g., isopolyacid, heteropolyacid); and organic compounds such as alcoholates, thiolates, amides, imides, carboxylates, sulfonates, phosphonates, phosphinates, salts of amino acids, carbamates, and xanthogenates.

The β-diketone, which reacts with rare earth metals to synthesize usual rare earth complexes, has the following formula (1), in which each of $R^1$ and $R^2$ is independently a substituted or non-substituted aryl, alkyl or heterocyclic aromatic group, and $R^3$ is a desired monovalent substituent.

(1)

In the above formula, the substituents can be properly selected in consideration of availability of the materials, required excitation wavelength and resultant emission intensity of the rare earth complex. Each of $R^1$ and $R^2$ is independently a substituted or non-substituted aryl, alkyl or heterocyclic aromatic group. Examples of the aryl group include phenyl, naphthyl, biphenyl, anthryl, terphenyl, cyclopentadienyl, and indenyl. Examples of the heterocyclic aromatic group include furyl, thienyl, pyridyl, quinolyl, and pyrrolyl.

In the case where the above aryl, alkyl or heterocyclic aromatic group has a substituent, examples of the substituent include fluoro, alkyl or perfluoroalkyl groups, cyano, nitro, alkoxy groups, substituted or non-substituted amino groups, and thio. Among the above, methyl, ethyl, propyl, butyl, phenyl, a pefuluoro-substituted group thereof, methylphenyl, ethylphenyl, methoxyphenyl, ethoxyphenyl, thienyl, naphthyl, furyl, pyridyl and quinolyl are preferred as each of $R^1$ and $R^2$. Further, methyl, trifluoromethyl, butyl, heptafuluoropropyl, phenyl naphthyl and thienyl are more preferred.

There is no particular restriction on $R^3$ as long as it is a monovalent group. Examples of $R^3$ include H, halogen atoms and hydrocarbon groups. Among them, H and F are particularly preferred.

In the following description, the phosphine oxide ligand comprised in the fluorescent substance according to the present invention is explained. The phosphine oxide ligand is represented by the following formula (2):

(2)

wherein

Rs may be individually the same or different, provided that at least one of them has a siloxane bond, namely, Si—O—Si bond, and that the others are selected from the group consisting of alkyl groups, substituted alkyl groups, alkoxy groups, substituted alkoxy groups, phenyl, substituted phenyl groups, biphenyl, substituted biphenyl groups, naphthyl, and substituted naphthyl groups. One of the Rs may be a divalent hydrocarbon group, such as an alkylene group containing 1 to 7 carbon atoms, connecting to another phosphine oxide represented by the formula (2). In the present invention, there is no particular restriction on the Rs as long as at least one of them has a siloxane bond.

In the present invention, the siloxane bond contained in the phosphine oxide ligand does not limit neighboring substituents. However, the siloxane bond is preferably contained as a part of silicone resin.

In LED elements, silicone resins are often used as sealant. Accordingly, if a silicone resin comprised in the sealant composition is made to react with the rare earth complex to introduce the siloxane bond into the fluorescent substance, it can serve both as a component of the sealant composition and as a component of the fluorescent substance. This is advantageous and hence preferred. For synthesizing a silicone resin used for sealing LED elements, a silicone compound containing H—Si— group (hereinafter, referred to as "hydro-silicone") and a silicone compound containing $CH_2$=CH—Si— group (hereinafter, referred to as "vinyl silicone") are generally subjected to a catalytic addition reaction to harden. In detail, the hydro-silicone and vinyl silicone compounds are made to react in the presence of catalyst to form the chemical structure $CH_2$—$CH_2$—Si. The siloxane bond in the phosphine oxide ligand according to the present invention is particularly preferably derived from the hydro-silicone and vinyl silicone compounds.

The phosphine oxide ligand is preferably represented by the following formula (2a):

(2a)

wherein

L is a divalent linking group, and S is a group containing the siloxane bond. For example, L is a single bond or a substituted or non-substituted hydrocarbon group. Concrete examples of L include single bond, alkylene and arylene groups containing 1 to 3 carbon atoms, ether bond, and hydrocarbon groups containing ether bonds. In the above formula, S is a group containing the siloxane bond and is preferably represented by the following formula (Sa):

(Sa)

wherein each of R's is independently H, a substituted or non-substituted hydrocarbon group, a substituted or non-substituted amido group, hydroxyl, or a group containing the siloxane bond represented by the formula (Sa). In particular, an alkyl group containing 1 to 3 carbon atoms and a group containing the siloxane bond represented by the formula (Sa) are preferred. Since functioning as a resin component of the luminous composition, the above structure preferably contains reactive groups such as H, hydroxyl and an amido group in small amounts. In the case where it is further subjected to another reaction, the structure must contain required reactive groups.

For availability of the production materials and for simplification of the production process in the present invention, a silicone compound is generally made to react with a phosphine oxide in the free form or in the form of a ligand coordinating to the rare earth metal, so as to introduce the siloxane bond into the phosphine oxide ligand. It is preferred to make a hydro-silicone compound react with a phosphine oxide containing a substituent reactable therewith, or otherwise to make a vinyl silicone compound react with a phosphine oxide containing a substituent reactable therewith. It is more preferred to make a hydro-silicone compound react with a phosphine oxide containing a substituent reactable therewith. The phosphine oxide reactable with a hydro-silicone compound is, for example, a phosphine oxide containing an unsaturated bond such as $CH_2$=CH—, hydroxyl, or a substituted or non-substituted amino group. A phosphine oxide containing vinyl, an aryl group or hydroxyl is particularly preferred. Examples of the phosphine oxide include diphenylvinylphosphine oxide, allyidiphenylphosphine oxide, and diphenylphosphinyl methanol, which are commercially available from Sigma-Aldrich Corporation. However, the present invention is not limited by these examples.

There is no particular restriction on the hydro-silicone compound, which is, for example, represented by the following formulas (HS-1) to (HS-5).

(HS-1) Molecular weight 15,000-60,000 MeHSiO:0.5-10mole%
(HS-2) Molecular weight 5,500-6,500 MeHSiO:7-8mole%
(HS-3) Molecular weight 1,900-2,000 MeHSiO:15-18mole%

(HS-4) Molecular weight 2,100-2,400

(HS-5) Hydrogen equivalent 7.8-9.2eq/kg

The above are commercially available, for example, from Gelest, Inc. under the trademarks of HMS-013, HMS-082, HMS-151, HMS-993, and HQM-105.

There is also no particular restriction on the vinyl silicone compound, which is, for example, represented by the following formulas.

(VS-1) Molecular weight 800 Vinyl equivalent 2.4-2.9eq/kg (VS-2) Vinyl methylsiloxane 0.8-1.2mole%
(VS-3) Vinyl methylsiloxane 25-30mole% terminal 4-8% silanol (VS-4) Vinyl equivalent 0.2-0.3eq/kg
(VS-5) Vinyl equivalent 0.4-0.6eq/kg (VS-6) Molecular weight 27,000 Diphenyl siloxane 3.0-3.5mole%

The above are commercially available, for example, from Gelest, Inc. under the trademarks of DMS-V05, VDT-131, VDS-2513, VQM-135, VQX-221 and PDV-0331.

As described above, the siloxane bond is generally introduced into the phosphine oxide by the reaction between a silicone compound and the phosphine oxide. The reaction is generally carried out in the presence of platinum catalyst at a temperature of 100 to 150° C. for 1 to 10 hours. However, the reaction conditions are not particularly restricted and properly selected according to the structure and usage of the aimed fluorescent substance.

In the present invention, the effect of enhancing f-f transition is obtained when the siloxane bond is introduced into the phosphine oxide molecule, and hence it is dispensable that the fluorescent substance prepared from the reaction between the phosphine oxide and a silicone compound be further made to react with another silicone compound. However, if particular properties such as hardness and adhesion are required to the resultant silicone resin composition, auxiliary silicone compounds or other desired silicon-containing or silicon-free materials can be added to perform the reaction.

For example, the reaction between the hydro-silicone and vinyl silicone compounds is generally required for preparing the sealing resin of LED. On the other hand, the fluorescent substance according to the present invention can also serve as the sealing resin of LED, or can be mixed therein. Accordingly, in that case, the hydro-silicone or vinyl silicone compound combined with the phosphine oxide is preferably made to react with the vinyl silicone or hydro-silicone compound, respectively.

Ideally, the silicone compound (e.g., hydro-silicone) combined with the phosphine oxide is made to react with another silicone compound (e.g., vinyl silicone) under the same conditions as the aforementioned reaction between the phosphine oxide and the silicone compound. However, the reaction conditions are not particularly restricted and properly selected according to the structure and usage of the aimed fluorescent substance.

In the case where the phosphine oxide is made to react with two or more different silicone compounds, the reaction between the phosphine oxide and one silicone compound is preferably carried out before the reaction between the silicone compounds. For example, when the phosphine oxide is to be reacted with the hydro-silicone and vinyl silicone compounds, the reaction between the phosphine oxide and the hydro-silicone compound is preferably carried out before that between the hydro-silicone and vinyl silicone compounds. This is because the hydro-silicone and vinyl silicone compounds often react and harden to form a silicone in the form of gel, rubber or resin, or to form a viscous silicone, and the thus-formed silicone cannot disperse the phosphine oxide homogeneously. The phosphine oxide, therefore, is preferably made to react first with the hydro-silicone compound and then with the vinyl silicone compound.

In the above reaction, the phosphine oxide is preferably reacted in the form of a ligand coordinating to the rare earth metal. That is to say, the rare earth complex is preferably made to react with the hydro-silicone compound. This is because free ligands such as the phosphine oxide often function as poison of the above catalyst to inhibit the reaction. The phosphine oxide, therefore, is made to coordinate to the rare earth metal to form a complex, and thereby the phosphine oxide in the free form is decreased enough to prevent the reaction from inhibition.

The process for manufacturing of the fluorescent substance according to the present invention preferably comprises the steps of:
(1) making a phosphine oxide ligand coordinate to a rare earth metal,
(2) making a silicone compound react with the coordinating phosphine oxide ligand, and
(3) if necessary, making the obtained compound react with another silicone compound.

Japanese Patent No. 3811142 describes that a complex of $Eu^{3+}$ coordinated by three β-diketonato ligands has two positions where phosphine oxide ligands can coordinate and that the complex emits luminescence of high intensity when different phosphine oxide ligands coordinate at those positions. Generally, two or more phosphine oxide ligands can coordinate to the rare earth metal, and in the present invention it is necessary that at least one of the phosphine oxide ligands contain the siloxane bond according to the present invention. There is no particular restriction on the other phosphine oxide ligands. That is to say, a phosphine oxide ligand not containing the siloxane bond or a β-diketonato ligand may coordinate to the rare earth metal. Two or more kinds of ligands preferably coordinate to the rare earth metal because the ligand field is distorted by coordination of the different ligands to increase the emission intensity in many cases. It is particularly preferred that the rare earth metal be coordinated both by a phosphine oxide ligand containing the siloxane bond and by a β-diketonato ligand.

The fluorescent complex according to the present invention absorbs light, and then emits luminescence at a longer wavelength. This property can be utilized so that a light-emitting element working on electric energy, such as an LED element or an electroluminescence element, may exhibit light at a wavelength different from its original wavelength. Further, the complex can be combined with YAG fluorescent substances, dyes or the like to produce a light-emitting element excellent in color rendering.

Figure 8:
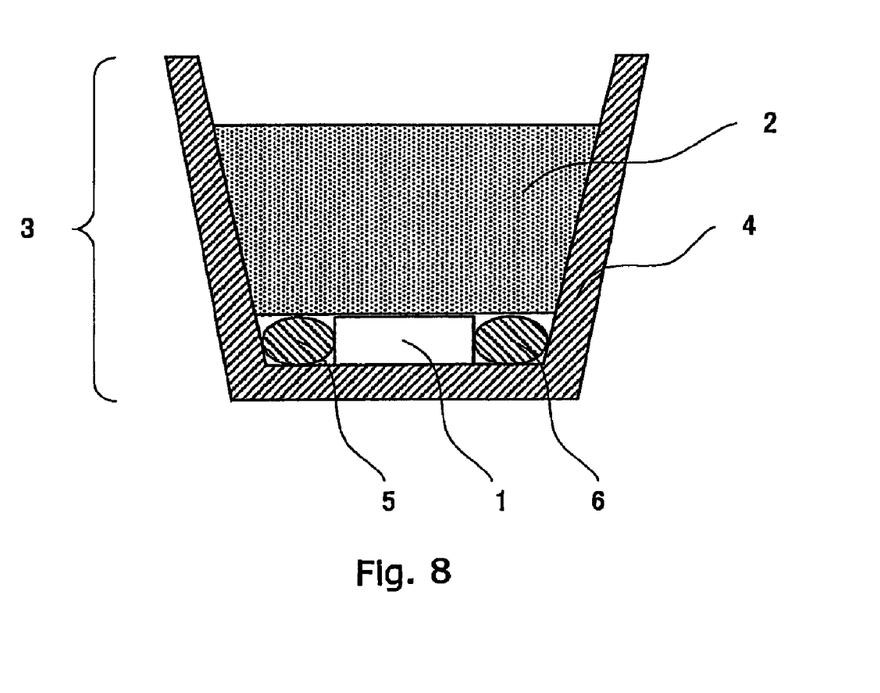
FIG. 8 is a schematic cross-sectional view of the LED element according to one embodiment of the present invention.

Examples of the above light-emitting element include an LED element, whose cross-sectional view is shown in FIG. 8. In FIG. 8, an LED chip 1 is provided on a storage vessel 4, and a fluorescent layer 2 comprising the fluorescent substance according to the present invention is placed on the LED chip 1. The LED chip 1 emits light when electric power is supplied from electrodes 5 and 6. In this constitution, the fluorescent layer 2 shows luminescence when irradiated with light emitted from the LED chip, so that the LED element 3 functions.

An LED element according to one embodiment of the present invention comprises the aforementioned fluorescent substance. The LED element generally comprises a diode, a fluorescent layer comprising at least one fluorescent substance described above, and if needed, a layer comprising other colorant or luminous compositions. The color of light emitted from the diode, that from the luminous composition according to the present invention and, if provided, that from the other colorant or luminous compositions are properly combined to obtain luminescence of the aimed color. For example, a diode emitting blue luminescence, a chip with a yellow fluorescent substance and a luminous composition emitting red fluorescence according to the present invention are combined to produce a reddish white LED element. Further, a blue diode and a mixture of green and red luminous compositions according to the present invention in proper amounts are combined to produce a white LED element. To produce an LED element of monochrome such as red or green, a diode emitting light in the near UV region is combined with a luminous composition emitting light of the aimed color according to the present invention or otherwise is combined with such a set of compositions comprising at least one luminous composition according to the present invention that colors of the emitted light are properly mixed to obtain the aimed color.

An EL (electroluminescence) element according to one embodiment of the present invention comprises the aforementioned fluorescent substance. In the same manner as described above for designing the LED element, an EL element emitting blue light when proper voltage is applied can be also combined with a green or red luminous composition comprising at least one fluorescent substance according to the present invention, so that the EL element may exhibit light of the aimed color, for example, white. Further, the luminous composition according to the present invention can be introduced into an EL element so as to make up for the color appearance or intensity of electroluminescence at a particular wavelength.

The luminous composition used in the present invention can be introduced into a light-emitting element in the manner described below. When the luminous composition is to be combined with a LED chip, it is preferred in view of the convenience of the production process that the silicone compound before hardened, which is the same as that used as the sealing resin of LED, be dropped onto the chip provided on the storage vessel and then heated to promote the thermosetting reaction. Preferably, in consideration of storability and treatability, a mixture comprising at least a hydro-silicone compound and a luminous composition according to the present invention (hereinafter referred to as "liquid A") and another mixture comprising at least a vinyl silicone compound and catalyst (hereinafter referred to as "liquid B") are independently stored, and immediately before the reaction the liquids A and B are mixed so as to prevent the reaction from proceeding in storage. However, the present invention is by no means restricted by this procedure.

The luminous composition according to the present invention can be also introduced into light-emitting elements other than LED by known normal methods such as the dropping method, the coating method, the casting method, and the adhesion with binder. The method can be properly selected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

The present invention is further explained by the following examples.

Example 1

Tris(6,6,7,7,8,8,8-heptafluoro-2,2-dimethyl-3,5-octanedionato)europium (Resolve-A1 [trademark], available from Sigma-Aldrich Corporation, EuFOD16093, hereinafter referred to as "Eu-complex A"), in which the rare earth metal is $Eu^{3+}$ and the β-diketonato ligand is 6,6,7,7,8,8,8-heptafluoro-2,2-dimethyl-3,5-octanedionato, was used. On the other hand, allyldiphenylphosphine oxide (A1463 [trademark], available from Tokyo Chemical Industry Co., Ltd.) was also used as a phosphine oxide containing an allyl group. These compounds were used in the following reaction.

One equivalent of Eu-complex A and two equivalents of allyldiphenylphosphine oxide were dissolved in 20 ml of ethanol. The solution was heated and stirred, and then dried to obtain white crystalline solid.

Thereafter, (7-8% methylhydroxysiloxane)-dimethyl-siloxane copolymer having trimethylsiloxane terminal (HMS082 [trademark], available from Gelest, Inc., hereinbefore referred to as "HS-2") and, as a catalyst, platinum-cyclovinylmethyl-siloxane complex solution (SiP6832.2 [trademark], available from Gelest, Inc., hereinafter referred to as "catalyst X") were used in the following reaction.

Figure 1:
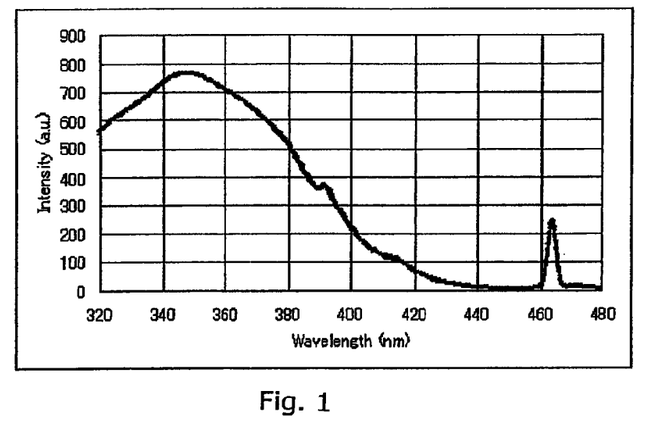
FIG. 1 is an excitation spectrum of the composition obtained in Example 1, said spectrum being monitored at 616 nm, where the luminescence of $Eu^{3+}$ is positioned.

A mixture in which 30 mg of the above-obtained white crystalline solid, 130 mg of the hydro-silicone compound HS-2 and 1 μL of catalyst X were homogeneously dispersed was heated and stirred at 120° C. for 2 hours and then further heated and stirred at 150° C. for 4 hours to obtain a white rubber composition. The excitation spectrum of the obtained composition was monitored at 616 nm, where the luminescence of $Eu^{3+}$ is positioned, and shown in FIG. 1.

Example 2

Figure 2:
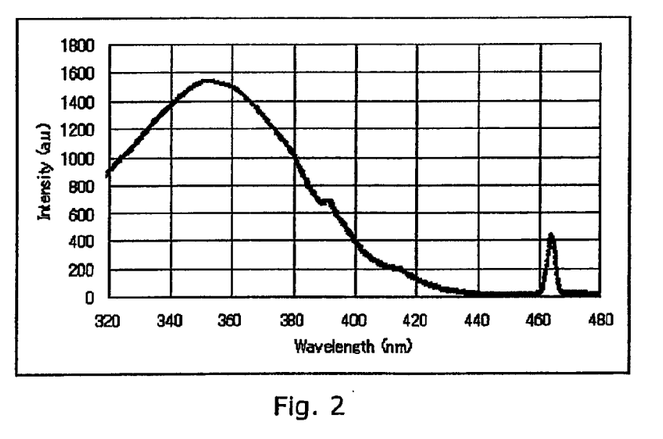
FIG. 2 is an excitation spectrum of the composition obtained in Example 2, said spectrum being monitored at 616 nm, where the luminescence of $Eu^{3+}$ is positioned.

The procedure of Example 1 was repeated, except that two equivalents of allyldiphenylphosphine oxide were replaced with two equivalents of diphenylphosphinylmethanol (available from Sigma-Aldrich Corporation) as a phosphine oxide containing hydroxyl, to obtain a white rubber composition. The excitation spectrum of the obtained composition was monitored at 616 nm, where the luminescence of $Eu^{3+}$ is positioned, and shown in FIG. 2.

Example 3

Figure 3:
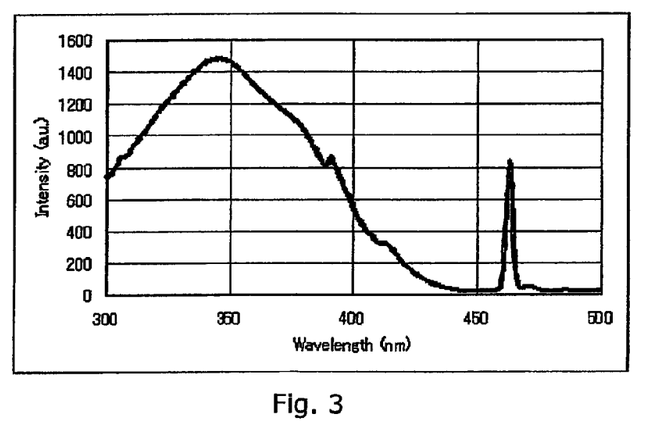
FIG. 3 is an excitation spectrum of the composition obtained in Example 3, said spectrum being monitored at 616 nm, where the luminescence of $Eu^{3+}$ is positioned.

The procedure of Example 1 was repeated, except that two equivalents of allyldiphenylphosphine oxide were replaced with a mixture of one equivalent of allyldiphenylphosphine oxide and one equivalent of trioctylphosphine oxide (22330-1 [trademark], available from Sigma-Aldrich Corporation) as a phosphine oxide containing no reactive group, to obtain a white rubber composition. The excitation spectrum of the obtained composition was monitored at 616 nm, where the luminescence of $Eu^{3+}$ is positioned, and shown in FIG. 3.

Example 4

Figure 4:
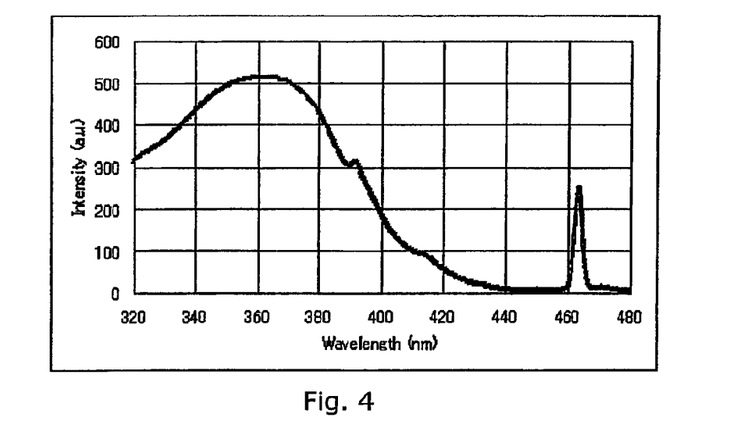
FIG. 4 is an excitation spectrum of the composition obtained in Example 4, said spectrum being monitored at 616 nm, where the luminescence of $Eu^{3+}$ is positioned.

The reaction of Example 3 was carried out to react the Eu complex with the two kinds of phosphine oxide, and then 100 mg of the reaction product, 130 mg of the hydro-silicone compound HS-2 and 1 μL of catalyst X were mixed and homogeneously dispersed. After the mixture was heated and stirred at 120° C. for 2 hours, 200 mg of a vinyl silicone compound having a side chain combined with vinyl group (VQM135 [trademark], available from Gelest, Inc., hereinbefore referred to as "VS-4") and 1 μL of catalyst X were added. The resultant mixture was further heated and stirred at 150° C. for 4 hours to obtain a white rubber composition. The excitation spectrum of the obtained composition was monitored at 616 nm, where the luminescence of $Eu^{3+}$ is positioned, and shown in FIG. 4.

Example 5

Figure 5:
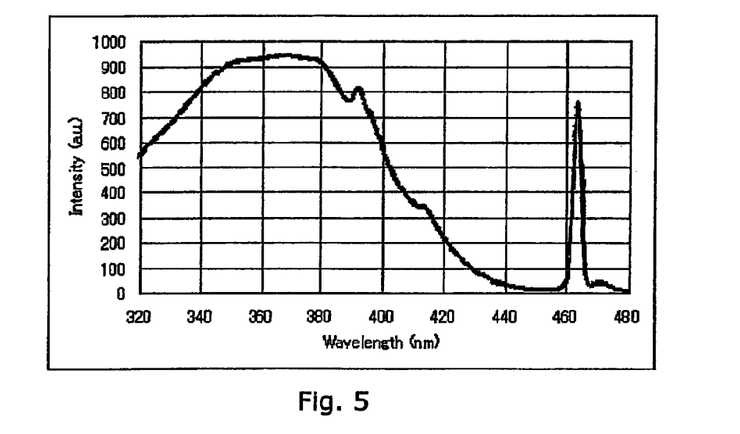
FIG. 5 is an excitation spectrum of the composition obtained in Example 5, said spectrum being monitored at 616 nm, where the luminescence of $Eu^{3+}$ is positioned.

The reaction of Example 3 was carried out to react the Eu complex with the two kinds of phosphine oxide, and then 100 mg of the reaction product, 20 mg of a hydro-silicone compound having hydroxyl terminal (HQM105 [trademark], available from Gelest, Inc., hereinbefore referred to as "HS-5") and 1 μL of catalyst X were mixed and homogeneously dispersed. After the mixture was heated and stirred at 120° C. for 2 hours, 160 mg of VS-4 and 1 μL of catalyst X were added. The resultant mixture was further heated and stirred at 150° C. for 4 hours to obtain a colorless rubber composition. The excitation spectrum of the obtained composition was monitored at 616 nm, where the luminescence of $Eu^{3+}$ is positioned, and shown in FIG. 5.

Example 6

Figure 6:
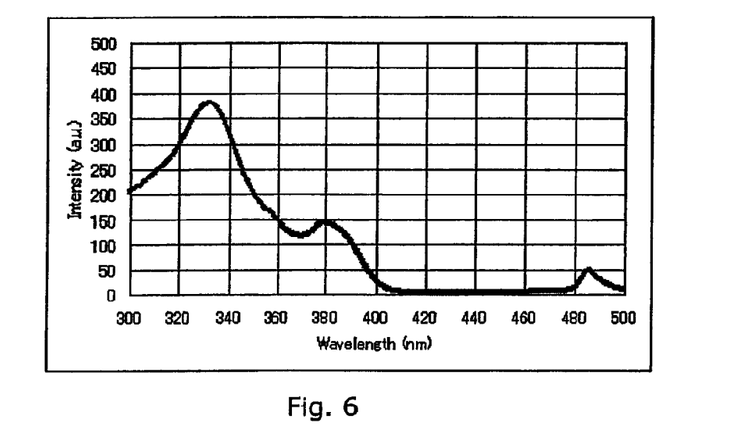
FIG. 6 is an excitation spectrum of the composition obtained in Example 6, said spectrum being monitored at 545 nm, where the luminescence of $Tb^{3+}$ is positioned.

The procedure of Example 4 was repeated, except that Eu-complex A was replaced with a $Tb^{3+}$ complex (AKT821 [trademark], available from Gelest, Inc., hereinafter referred to as "Tb-complex B") in which the rare earth metal was $Tb^{3+}$ and the β-diketonato ligand was dipivaloylmethanato, to obtain a white rubber composition. The excitation spectrum of the obtained composition was monitored at 545 nm, where the luminescence of $Tb^{3+}$ is positioned, and shown in FIG. 6.

Comparative Example 1

The procedure of Example 4 was repeated, except that Eu-complex A was directly made to react with the silicone compound, to obtain a white rubber composition. The excitation spectrum of the obtained composition was monitored at 616 nm, where the luminescence of $Eu^{3+}$ is positioned, and shown in FIG. 7.

Referential Example 1

The procedure of Example 4 was repeated except that Eu-complex A was replaced with allyldiphenylphosphine oxide. The resultant silicone compound was still in the form of liquid and hence a rubber composition was not obtained.

Figure 7:
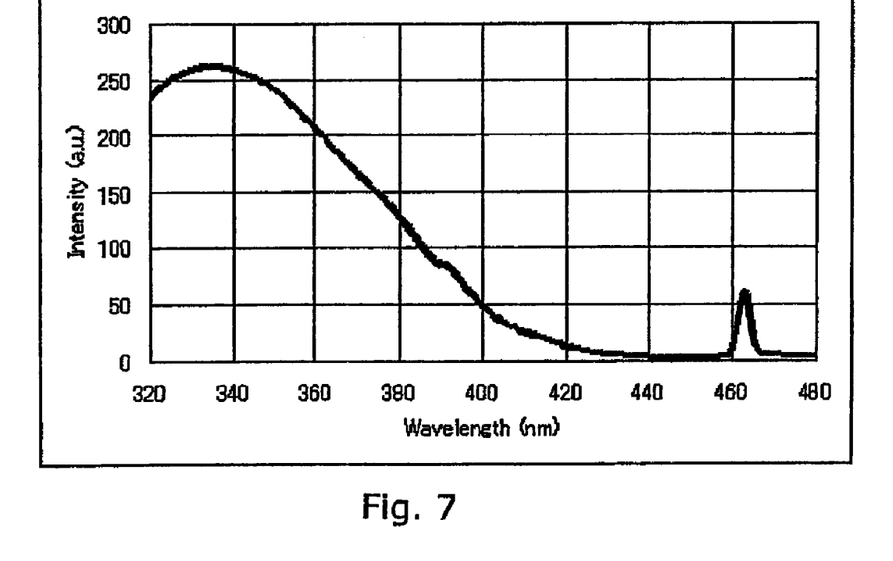
FIG. 7 is an excitation spectrum of the composition obtained in Comparative Example 1, said spectrum being monitored at 616 nm, where the luminescence of $Eu^{3+}$ is positioned.

As is evident from the excitation spectra of FIGS. 1 to 7, the f-f transitions shown in the excitation spectra of the luminous compositions according to the present invention (FIGS. 1 to 6) were remarkably enhanced as compared with the f-f transition in the excitation spectrum of Comparative Example 1 (FIG. 7). Further, FIGS. 1 to 3 indicate that the f-f transition was enhanced by the reaction between the hydro-silicone compound and the phosphine oxide and accordingly that the reaction with the vinyl silicone compound is dispensable. In addition, Referential Example 1 indicates that, in order to prevent the hardening reaction of silicone from inhibition, the phosphine oxide to react with the hydro-silicone compound preferably coordinates to the rare earth metal.

The invention claimed is:

1. A fluorescent substance comprising a rare earth metal and a phosphine oxide ligand which coordinates to said rare earth metal and said ligand contains at least one siloxane bond in its structure.

2. The fluorescent substance according to claim 1, wherein said rare earth metal is at least one selected from the group consisting of Eu and Tb.

3. The fluorescent substance according to claim 1, wherein said phosphine oxide ligand is represented by the following formula (2):

(2)

wherein
Rs may be individually the same or different, provided that at least one of them has the siloxane bond and that the others are selected from the group consisting of alkyl groups, substituted alkyl groups, alkoxy groups, substituted alkoxy groups, phenyl, substituted phenyl groups, biphenyl, substituted biphenyl groups, naphthyl, and substituted naphthyl groups.

4. The fluorescent substance according to claim 1, further comprising at least one β-diketonato ligand.

5. A luminous composition comprising a fluorescent substance comprising a rare earth metal and a phosphine oxide ligand which coordinates to said rare earth metal and said ligand contains at least one siloxane bond in its structure.

6. A process for manufacturing of a fluorescent substance, comprising the step in which a rare earth complex comprising a rare earth metal and a phosphine oxide ligand which coordinates to said rare earth metal and said ligand contains at least one bond selected from the group consisting of unsaturated bonds, hydroxyl, and substituted and non-substituted amino groups is made to react with a compound containing at least one siloxane bond.

7. The process according to claim 6, wherein said compound containing at least one siloxane bond is a hydro-silicone compound.

8. The process according to claim 6 or 7, wherein the rare earth complex and a hydro-silicone compound are made to react and then further made to react with a vinyl silicone compound.

9. A light-emitting element comprising a luminous composition comprising the fluorescent substance according to claim 1.

10. The light-emitting element according to claim 9, comprising an excitation light source emitting light at least within the wavelength range of 300 to 480 nm.

* * * * *